US011877573B2

(12) United States Patent
Friezner

(10) Patent No.: US 11,877,573 B2
(45) Date of Patent: Jan. 23, 2024

(54) VECTOR CONTROL SCREEN FOR STORMWATER TREATMENT SYSTEMS

(71) Applicant: Denis Friezner, Boise, ID (US)

(72) Inventor: Denis Friezner, Boise, ID (US)

( * ) Notice: Subject to any disclaimer, the term of this patent is extended or adjusted under 35 U.S.C. 154(b) by 246 days.

(21) Appl. No.: 17/537,206

(22) Filed: Nov. 29, 2021

(65) Prior Publication Data

US 2022/0167609 A1 Jun. 2, 2022

Related U.S. Application Data

(60) Provisional application No. 63/120,429, filed on Dec. 2, 2020.

(51) Int. Cl.
*A01M 29/34* (2011.01)
*E03F 1/00* (2006.01)
*E03F 5/04* (2006.01)

(52) U.S. Cl.
CPC ............ *A01M 29/34* (2013.01); *E03F 1/002* (2013.01); *E03F 5/041* (2013.01)

(58) Field of Classification Search
None
See application file for complete search history.

(56) References Cited

U.S. PATENT DOCUMENTS

| | | | | | |
|---|---|---|---|---|---|
| 63,284 A | * | 3/1867 | Miller | ................ | E03F 5/0404 210/163 |
| 96,019 A | * | 10/1869 | Lyon | ................ | B01D 17/0208 210/533 |
| 109,067 A | * | 11/1870 | Smith | ................ | E03F 5/046 404/25 |
| 122,209 A | * | 12/1871 | Ashman et al. | ....... | E03F 5/0404 210/163 |
| 142,671 A | * | 9/1873 | Boschen | ................ | E03F 5/046 404/4 |
| 150,072 A | * | 4/1874 | Meyer | ................ | E03F 5/046 210/533 |
| RE5,920 E | * | 6/1874 | Meyer | ................ | 210/170.03 |
| 154,645 A | * | 9/1874 | Chase | ................ | A61B 10/007 55/494 |
| 183,279 A | * | 10/1876 | Banner | ................ | E03F 5/042 137/403 |
| 185,017 A | * | 12/1876 | Dark | ................ | E03F 5/0404 210/163 |
| 187,181 A | * | 2/1877 | Schmitz | ................ | B01D 61/08 137/448 |
| 192,811 A | * | 7/1877 | Bigeon | ................ | E03F 5/046 174/47 |
| 195,137 A | * | 9/1877 | Baw | ................ | F16K 15/03 137/527.6 |
| 208,809 A | * | 10/1878 | Gorman | ................ | E03F 5/046 404/4 |
| 227,614 A | * | 5/1880 | Cowden | ................ | E03F 5/042 137/247.19 |
| 232,948 A | * | 10/1880 | Deenham | ................ | E03F 1/00 210/163 |
| 233,104 A | * | 10/1880 | Langschmidt | ......... | B01D 61/08 137/248 |

(Continued)

*Primary Examiner* — Robert J Popovics
(74) *Attorney, Agent, or Firm* — James E. Brunton

(57) ABSTRACT

An apparatus for controlling ingress and egress of biologically transmitting insect species to standing water disposed within a stormwater treatment and water storage system.

1 Claim, 6 Drawing Sheets

(56) References Cited

U.S. PATENT DOCUMENTS

| | | | | |
|---|---|---|---|---|
| 242,329 A * | 5/1881 | Kelly | C02F 3/28 | 210/538 |
| 248,559 A * | 10/1881 | Jackson | A61B 10/007 | 4/220 |
| 295,823 A * | 3/1884 | Sievering | E03F 5/046 | 404/4 |
| 297,643 A * | 4/1884 | Stark | F16K 27/006 | 251/95 |
| 374,393 A * | 12/1887 | Campbell | E03F 5/046 | 404/25 |
| 391,339 A * | 10/1888 | Runyan | E03F 5/046 | 404/4 |
| RE10,980 E * | 1/1889 | Locke | 404/3 | |
| 416,830 A * | 12/1889 | Dark | E03F 5/04 | 137/247.11 |
| 440,067 A * | 11/1890 | Smith | E03F 5/0404 | 210/163 |
| 459,259 A * | 9/1891 | Shunk | E03F 5/0404 | 210/163 |
| 459,440 A * | 9/1891 | Coleman | B01D 17/0208 | 210/533 |
| 468,714 A * | 2/1892 | Whitten | E03F 5/046 | 404/25 |
| 472,567 A * | 4/1892 | White | B01D 35/04 | 210/418 |
| 505,130 A * | 9/1893 | Ryan | E03F 5/0404 | 285/391 |
| 506,267 A * | 10/1893 | Sefton | E03F 5/0404 | 210/163 |
| 576,790 A * | 2/1897 | O'Brien | E03F 5/042 | 137/433 |
| 601,794 A * | 4/1898 | Hershberger | E02B 13/00 | 210/170.03 |
| 603,561 A * | 5/1898 | Gross | E03F 5/046 | 404/4 |
| 623,108 A * | 4/1899 | Rogers et al. | E03F 5/0404 | 210/164 |
| 642,530 A * | 1/1900 | Robertson | E03F 5/046 | 210/307 |
| 672,868 A * | 4/1901 | Banwell | E03F 5/046 | 404/4 |
| 705,697 A * | 7/1902 | O'Brien | E03F 5/046 | 210/117 |
| 712,194 A * | 10/1902 | Kelly | E03F 5/042 | 137/247.19 |
| 714,185 A * | 11/1902 | Jackson et al. | E03F 5/046 | 404/25 |
| 783,556 A * | 2/1905 | Van Buskirk | E03F 5/0401 | 404/5 |
| 784,271 A * | 3/1905 | McDonald | E03F 5/046 | 404/4 |
| 791,381 A * | 5/1905 | Thompson | B01D 21/02 | 210/164 |
| 802,647 A * | 10/1905 | Koch | E03F 7/04 | 4/219 |
| 809,201 A * | 1/1906 | Lutz | E03F 1/00 | 210/317 |
| 821,675 A * | 5/1906 | Shaw | E03F 5/02 | 52/184 |
| 833,043 A * | 10/1906 | Gilchrist | E04F 17/12 | 193/34 |
| 868,672 A * | 10/1907 | Kurz | E03F 5/046 | 404/4 |
| 881,003 A * | 3/1908 | Kennely | E03F 5/046 | 52/21 |
| 898,205 A * | 9/1908 | Filskew | E03F 5/046 | 404/4 |
| 923,010 A * | 5/1909 | Booraem | E04H 4/1227 | 4/511 |
| 945,312 A * | 1/1910 | Firth | E03F 5/046 | 404/4 |
| 961,834 A * | 6/1910 | Barlet | E03F 7/06 | 210/446 |
| 976,327 A * | 11/1910 | White | E03F 5/046 | 404/4 |
| 1,005,371 A * | 10/1911 | Union | B01D 17/0208 | 210/533 |
| 1,066,316 A * | 7/1913 | Piper | B01D 61/08 | 404/5 |
| 1,220,123 A * | 3/1917 | Heybach | B01D 35/153 | 210/136 |
| 1,245,903 A * | 11/1917 | Gross | E03F 5/046 | 210/163 |
| 1,434,677 A * | 11/1922 | Burton | E03F 5/046 | 404/4 |
| 1,473,551 A * | 11/1923 | Gschwind | E03F 5/046 | 404/5 |
| 1,654,246 A * | 12/1927 | Egan | E03F 5/046 | 210/163 |
| 1,654,247 A * | 12/1927 | Egan | E03F 5/046 | 210/314 |
| 1,654,803 A * | 1/1928 | Griffith | E03F 5/046 | 210/242.1 |
| 1,656,653 A * | 1/1928 | Von Keller | E01C 11/223 | 52/607 |
| 1,659,307 A * | 2/1928 | Wittman | E03F 5/046 | 210/163 |
| 1,659,364 A * | 2/1928 | Kelley | E03F 5/046 | 404/4 |
| 1,693,977 A * | 12/1928 | Egan | E03F 5/046 | 210/163 |
| 1,998,514 A * | 4/1935 | Miller | E03F 5/046 | 405/36 |
| 2,263,259 A * | 11/1941 | Boosey | E03C 1/282 | 137/247.35 |
| 2,440,857 A * | 5/1948 | Hart | E03F 5/046 | 405/36 |
| 2,473,279 A * | 6/1949 | Witt | E03F 5/046 | 404/4 |
| RE23,205 E * | 3/1950 | Crocker | E03F 5/046 | 210/163 |
| 2,537,654 A * | 1/1951 | Curnutte | E03F 5/046 | 404/4 |
| 2,615,526 A * | 10/1952 | Lane | E03F 5/0404 | 188/153 R |
| 3,626,823 A * | 12/1971 | Toth | E01C 11/223 | 405/36 |
| 3,695,153 A * | 10/1972 | Dorris | E01C 11/223 | 52/21 |
| 3,714,733 A * | 2/1973 | Madonna | A01M 29/34 | 43/131 |
| 3,815,748 A * | 6/1974 | Johannessen | E03F 5/02 | 210/163 |
| 3,838,706 A * | 10/1974 | Klenk | E03F 5/0407 | 137/433 |
| 3,881,832 A * | 5/1975 | Maguire | E03F 5/06 | 210/164 |
| 3,914,911 A * | 10/1975 | Paasch | E03F 5/06 | 52/180 |
| 3,945,746 A * | 3/1976 | Bredbenner | E03F 5/06 | 210/163 |
| 4,046,482 A * | 9/1977 | Paasch | E03F 5/06 | 404/4 |
| 4,061,434 A * | 12/1977 | Carroll | E02D 29/14 | 52/21 |
| 4,215,716 A * | 8/1980 | Klenk | E03F 5/042 | 137/527.6 |
| 4,415,462 A * | 11/1983 | Finch | E02B 5/08 | 210/162 |
| 4,594,157 A * | 6/1986 | McGowan | E03F 5/06 | 210/163 |
| 4,610,566 A * | 9/1986 | Albang | E01C 11/223 | 249/11 |
| 4,650,365 A * | 3/1987 | Runnels | E02D 29/14 | 404/26 |
| 4,870,992 A * | 10/1989 | Irwin | E03C 1/298 | 137/846 |

(56) References Cited

U.S. PATENT DOCUMENTS

| | | | | |
|---|---|---|---|---|
| 4,919,564 A * | 4/1990 | Neathery | E02D 29/14 | 277/648 |
| 4,935,129 A * | 6/1990 | Wang | B01D 29/05 | 220/826 |
| 4,986,693 A * | 1/1991 | Salberg | E01C 11/223 | 404/98 |
| 5,232,587 A * | 8/1993 | Hegemier | E03F 5/0404 | 210/170.03 |
| 5,323,804 A * | 6/1994 | Lin | E03F 5/042 | 251/212 |
| 5,372,714 A * | 12/1994 | Logue, Jr. | E03F 5/0404 | 404/5 |
| 5,375,940 A * | 12/1994 | Kobayashi | E03F 5/06 | 404/5 |
| 5,403,474 A * | 4/1995 | Emery | E03F 5/046 | 210/474 |
| 5,405,539 A * | 4/1995 | Schneider | E03F 5/0404 | 210/170.03 |
| 5,575,925 A * | 11/1996 | Logue, Jr. | E03F 5/0404 | 404/5 |
| 5,632,888 A * | 5/1997 | Chinn | E03F 5/0404 | 210/163 |
| 5,702,595 A * | 12/1997 | Mossburg, Jr. | E03F 1/00 | 210/232 |
| 5,725,782 A * | 3/1998 | Chinn | E03F 1/00 | 210/767 |
| 5,733,445 A * | 3/1998 | Fanelli | E03F 5/0404 | 210/489 |
| 5,846,274 A * | 12/1998 | Smelser | B01D 53/85 | 55/385.2 |
| 5,925,241 A * | 7/1999 | Aldridge | B01J 20/20 | 96/147 |
| 5,954,952 A * | 9/1999 | Strawser, Sr. | E03F 1/00 | 210/489 |
| 5,980,740 A * | 11/1999 | Harms | E03F 5/14 | 210/170.03 |
| 6,010,622 A * | 1/2000 | Chinn | E03F 5/06 | 210/489 |
| 6,015,489 A * | 1/2000 | Allen | E03F 5/06 | 210/131 |
| 6,017,166 A * | 1/2000 | Mossburg, Jr. | E03F 5/0404 | 404/5 |
| 6,045,691 A * | 4/2000 | McDermott | B01D 29/27 | 210/502.1 |
| 6,080,307 A * | 6/2000 | Morris | E03F 5/0404 | 210/283 |
| 6,086,758 A * | 7/2000 | Schilling | B01D 39/1623 | 210/485 |
| 6,106,706 A * | 8/2000 | Roy | E03F 1/00 | 210/136 |
| 6,106,707 A * | 8/2000 | Morris | E03F 1/00 | 210/337 |
| 6,149,803 A * | 11/2000 | DiLoreto, Jr. | B01D 29/96 | 210/170.03 |
| 6,200,484 B1 * | 3/2001 | McInnis | E03F 5/0404 | 210/170.03 |
| 6,217,756 B1 * | 4/2001 | Martinez | E03F 5/0404 | 210/163 |
| 6,217,757 B1 * | 4/2001 | Fleischmann | B01D 24/46 | 210/166 |
| 6,231,758 B1 * | 5/2001 | Morris | E03F 5/046 | 210/337 |
| 6,254,770 B1 * | 7/2001 | Remon | E03F 5/0404 | 210/163 |
| 6,294,095 B1 * | 9/2001 | Lewis | E03F 1/00 | 210/477 |
| 6,298,011 B1 * | 10/2001 | Nyberg | A01M 1/226 | 367/139 |
| 6,306,293 B1 * | 10/2001 | Schilling | E03F 5/0404 | 210/485 |
| 6,319,397 B1 * | 11/2001 | Su | E03F 5/0405 | 210/163 |
| 6,379,433 B1 * | 4/2002 | Scranton, Jr. | B01D 53/0431 | 55/412 |
| 6,402,942 B2 * | 6/2002 | Cardwell | E03F 5/0404 | 210/489 |
| 6,517,709 B1 * | 2/2003 | Cardwell | E03F 1/00 | 210/170.03 |
| 6,521,122 B1 * | 2/2003 | Elliot | E03F 5/0404 | 210/170.03 |
| 6,537,446 B1 * | 3/2003 | Sanguinetti | E03F 5/0404 | 210/474 |
| 6,551,023 B2 * | 4/2003 | Allard | E03F 1/00 | 405/36 |
| 6,551,505 B2 * | 4/2003 | Chinn | E03F 1/00 | 210/170.03 |
| 6,666,974 B2 * | 12/2003 | Page | E03F 1/00 | 210/170.03 |
| 6,706,172 B2 * | 3/2004 | Strawser, Sr. | B01D 29/05 | 210/474 |
| 6,709,579 B1 * | 3/2004 | Singleton | E03F 5/0404 | 210/474 |
| 6,726,402 B1 * | 4/2004 | Martinez | E03F 5/0404 | 405/36 |
| 6,733,665 B1 * | 5/2004 | Khalil | B01D 21/0012 | 210/163 |
| 6,797,162 B2 * | 9/2004 | Happel | E03F 1/00 | 210/163 |
| 6,808,623 B2 * | 10/2004 | Harris | E03F 1/00 | 210/170.03 |
| 6,811,708 B2 * | 11/2004 | Shaw | E03F 1/00 | 210/162 |
| 6,821,053 B2 * | 11/2004 | Martinez | E03F 5/046 | 405/36 |
| 6,824,677 B2 * | 11/2004 | Martinez | E03F 1/00 | 210/170.03 |
| 6,869,523 B2 * | 3/2005 | Martinez | E03F 5/046 | 210/163 |
| 6,872,029 B2 * | 3/2005 | Allard | B01D 35/05 | 405/36 |
| 6,884,343 B2 * | 4/2005 | Harris | B01D 29/014 | 210/163 |
| 6,905,599 B2 * | 6/2005 | Allard | E03F 1/002 | 210/170.03 |
| 6,908,549 B2 * | 6/2005 | Middleton | E03F 5/0401 | 210/232 |
| 6,953,524 B2 * | 10/2005 | Woodbridge | E03F 5/12 | 210/162 |
| 6,972,088 B2 * | 12/2005 | Yehuda | E03F 5/046 | 210/163 |
| 6,974,540 B1 * | 12/2005 | Fleischmann | E03F 1/00 | 210/163 |
| 6,997,636 B2 * | 2/2006 | Tremouilhac | E03F 5/046 | 404/5 |
| 6,998,039 B2 * | 2/2006 | Harris | E03F 1/00 | 210/474 |
| 7,013,500 B1 * | 3/2006 | Lin | E03C 1/262 | 4/290 |
| 7,074,326 B2 * | 7/2006 | Singleton | E03F 5/0404 | 210/489 |
| 7,083,721 B2 * | 8/2006 | McClure | E03F 1/00 | 210/162 |
| 7,131,787 B2 * | 11/2006 | McGinn | E03F 5/0404 | 405/36 |
| 7,147,000 B1 * | 12/2006 | Chen | E03C 1/23 | 251/210 |
| 7,156,987 B1 * | 1/2007 | Sanguinetti | E03F 1/00 | 210/474 |
| 7,160,048 B1 * | 1/2007 | Fattori | E01C 11/227 | 404/2 |
| 7,163,635 B2 * | 1/2007 | Fitzgerald | E03F 5/0404 | 210/170.03 |
| 7,179,371 B1 * | 2/2007 | Bistline | E03F 5/0404 | 210/473 |
| 7,234,894 B1 * | 6/2007 | Flury | E03F 5/046 | 405/94 |
| 7,238,279 B2 * | 7/2007 | Saurenman | E03F 5/0404 | 210/163 |

(56) References Cited

U.S. PATENT DOCUMENTS

| | | | | |
|---|---|---|---|---|
| 7,246,968 B1 * | 7/2007 | Priest | | E03F 5/0404 404/5 |
| 7,246,969 B2 * | 7/2007 | Orser | | E01C 11/223 404/5 |
| 7,300,574 B1 * | 11/2007 | Lewis | | E03F 5/0404 210/473 |
| 7,300,590 B2 * | 11/2007 | Weir | | E03F 5/16 210/170.03 |
| 7,357,861 B2 * | 4/2008 | Kelley | | E03F 5/0404 210/473 |
| 7,438,802 B2 * | 10/2008 | Hurst | | E03F 5/0404 210/348 |
| 7,455,766 B1 * | 11/2008 | Lewis | | E03F 5/0404 210/473 |
| 7,467,911 B2 * | 12/2008 | Flury | | E03F 5/0404 210/170.03 |
| 7,479,221 B2 * | 1/2009 | Paoluccio | | E03F 1/00 210/163 |
| 7,481,921 B2 * | 1/2009 | Kent | | E03F 1/00 210/170.03 |
| 7,491,338 B2 * | 2/2009 | Nino | | E03F 1/00 210/791 |
| 7,524,414 B1 * | 4/2009 | Barragan | | E03F 5/0404 210/170.03 |
| 7,540,953 B2 * | 6/2009 | Fitzgerald | | C02F 1/004 210/170.03 |
| 7,549,820 B1 * | 6/2009 | Happel | | E03F 1/00 210/163 |
| 7,563,364 B2 * | 7/2009 | Shaw | | B01D 35/301 210/163 |
| 7,563,453 B2 * | 7/2009 | Dupree | | A01N 25/34 424/408 |
| 7,588,689 B2 * | 9/2009 | Paoluccio | | E03F 1/00 210/660 |
| 7,611,304 B2 * | 11/2009 | Lill | | E02D 29/1427 210/163 |
| 7,662,280 B1 * | 2/2010 | Cooney | | E02D 31/004 210/85 |
| D612,018 S * | 3/2010 | Howard | | D23/261 |
| 7,670,080 B2 * | 3/2010 | Tzaig | | E02D 29/12 210/170.03 |
| 7,699,978 B2 * | 4/2010 | Dyer | | E03F 5/0404 210/163 |
| 7,771,591 B2 * | 8/2010 | Lucas | | E03F 5/0404 210/489 |
| 7,780,372 B2 * | 8/2010 | Fattori | | E01C 11/223 404/2 |
| 7,857,966 B2 * | 12/2010 | Duran | | E03F 5/0404 210/170.03 |
| 7,879,233 B2 * | 2/2011 | Shaw | | E03F 5/0404 210/164 |
| 7,922,916 B1 * | 4/2011 | Witt | | E03F 1/00 210/170.03 |
| 7,951,291 B2 * | 5/2011 | Nino | | E03F 1/00 210/162 |
| 7,959,799 B2 * | 6/2011 | Happel | | B01D 21/0012 210/166 |
| 7,985,335 B2 * | 7/2011 | Allard | | E03F 5/0404 210/170.03 |
| 7,988,870 B2 * | 8/2011 | Belasco | | E03F 5/0404 210/170.03 |
| 7,993,072 B2 * | 8/2011 | Lill | | E03F 5/046 210/163 |
| 8,002,977 B2 * | 8/2011 | Shaw | | E03F 5/0404 210/232 |
| 8,012,346 B2 * | 9/2011 | Peters, Jr. | | E03F 5/0404 210/170.03 |
| 8,017,006 B2 * | 9/2011 | Lopez | | E03F 1/00 210/170.03 |
| 8,043,498 B2 * | 10/2011 | Rueda | | E03F 5/0404 210/348 |
| 8,051,568 B2 * | 11/2011 | Moody | | E03F 5/0404 210/691 |
| 8,075,220 B1 * | 12/2011 | Suljevic | | E01C 11/222 404/2 |
| 8,216,453 B2 * | 7/2012 | Moody | | E03F 5/0404 210/232 |
| 8,235,624 B2 * | 8/2012 | Lill | | E03F 5/046 210/163 |
| 8,277,645 B2 * | 10/2012 | Jarvis, Jr. | | E03F 5/0404 210/162 |
| 8,323,485 B2 * | 12/2012 | Blundell | | E03F 1/002 210/170.03 |
| 8,343,357 B2 * | 1/2013 | Horner | | E03F 1/00 210/170.03 |
| 8,388,835 B2 * | 3/2013 | Haschke | | E03F 5/0404 210/170.03 |
| 8,475,655 B2 * | 7/2013 | Sasaki | | E03F 5/14 210/170.03 |
| 8,535,523 B2 * | 9/2013 | Friezner | | F15D 1/0005 210/170.03 |
| 8,557,108 B2 * | 10/2013 | Rennels | | E03C 1/264 210/163 |
| 8,591,729 B2 * | 11/2013 | Alqanee | | E03F 5/0405 210/170.03 |
| 8,652,323 B2 * | 2/2014 | Dorsey | | E03F 5/14 210/164 |
| 8,657,524 B2 * | 2/2014 | Lill | | E03F 5/06 210/163 |
| 8,679,328 B2 * | 3/2014 | Hebert | | E03F 5/0404 210/163 |
| 8,679,329 B2 * | 3/2014 | Vreeland | | E03F 5/0404 210/170.03 |
| 8,940,160 B2 * | 1/2015 | Lill | | E03F 5/06 210/170.03 |
| 8,945,375 B2 * | 2/2015 | Friezner | | F15D 1/0005 210/170.03 |
| 8,980,084 B2 * | 3/2015 | Dorsey | | E03F 5/06 210/163 |
| 9,010,363 B2 * | 4/2015 | Huber | | E03F 5/042 137/527 |
| 9,038,661 B2 * | 5/2015 | Lin | | E03F 5/0407 137/532 |
| 9,044,001 B2 * | 6/2015 | Meghji | | A01M 1/026 |
| 9,057,189 B2 * | 6/2015 | Flury | | E03F 5/14 |
| 9,139,991 B2 * | 9/2015 | Huber | | E03C 1/298 |
| 9,151,033 B2 * | 10/2015 | Jarvis | | E03F 5/0404 |
| 9,249,553 B2 * | 2/2016 | Perron | | B01D 46/0028 |
| 9,267,252 B1 * | 2/2016 | Adler | | E02D 29/14 |
| 9,279,242 B2 * | 3/2016 | Alvarado | | E03F 5/06 |
| 9,322,155 B2 * | 4/2016 | Jarvis | | E03F 5/06 |
| 9,416,986 B2 * | 8/2016 | Huber | | E03F 5/042 |
| 9,428,899 B2 * | 8/2016 | Friezner | | E03F 5/0404 |
| 9,512,606 B2 * | 12/2016 | Allard | | E03F 1/002 |
| 9,573,086 B2 * | 2/2017 | Corder | | B01D 35/02 |
| 9,624,658 B2 * | 4/2017 | Hannah | | E03F 5/14 |
| 9,752,315 B1 * | 9/2017 | Phillips | | E03F 5/0411 |
| 9,976,294 B1 * | 5/2018 | Flury | | E03F 5/0411 |
| 10,030,374 B2 * | 7/2018 | McAlpine | | E03F 5/08 |
| 10,053,382 B2 * | 8/2018 | Wilkie | | C02F 1/004 |
| 10,094,099 B1 * | 10/2018 | Flury | | E03F 5/0411 |
| 10,178,860 B2 * | 1/2019 | Wesson | | A01M 1/106 |
| 10,180,260 B2 * | 1/2019 | Mantyla | | F16K 24/04 |
| 10,227,768 B2 * | 3/2019 | Jarvis | | E03F 5/06 |
| 10,335,724 B2 * | 7/2019 | Morris | | B01D 39/1692 |
| 10,384,155 B1 * | 8/2019 | DiLalla | | E03F 5/0404 |
| 10,407,891 B1 * | 9/2019 | Sanguinetti | | E03F 5/0404 |
| 10,422,119 B2 * | 9/2019 | Coppola | | B01D 29/118 |
| 10,465,371 B2 * | 11/2019 | Wacome | | E03F 5/0404 |
| 10,648,165 B1 * | 5/2020 | Friezner | | G01N 1/18 |
| 10,753,077 B2 * | 8/2020 | Coppola | | C02F 1/004 |
| 10,786,765 B2 * | 9/2020 | DiLalla | | B01D 29/27 |
| 10,864,466 B2 * | 12/2020 | Morris | | B01D 29/0095 |
| 10,907,338 B1 * | 2/2021 | Happel | | E03F 5/0403 |
| 10,995,483 B1 * | 5/2021 | Sanguinetti | | E03F 5/0404 |
| 10,995,484 B2 * | 5/2021 | Friezner | | G01N 1/12 |
| 11,124,958 B1 * | 9/2021 | Gagliardi | | E03F 5/0403 |
| 11,180,380 B2 * | 11/2021 | Sheets | | B01D 39/16 |

(56) References Cited

U.S. PATENT DOCUMENTS

| | | | | |
|---|---|---|---|---|
| 11,186,980 B2* | 11/2021 | Yeoman | ............ | B01D 21/0048 |
| 11,299,879 B2* | 4/2022 | Sheets | ............ | E03F 5/06 |
| 11,346,094 B2* | 5/2022 | Lee | ............ | B01D 35/02 |
| 11,371,203 B2* | 6/2022 | Banuelos | ............ | B32B 3/08 |
| 11,432,540 B1* | 9/2022 | Draeger | ............ | A01M 1/106 |
| 11,459,744 B2* | 10/2022 | Swope | ............ | C02F 1/001 |
| 11,473,264 B2* | 10/2022 | Isaacson | ............ | E02D 29/1454 |
| 11,713,567 B2* | 8/2023 | Sheets | ............ | B01D 39/083 |
| | | | | 210/747.3 |
| 11,724,224 B2* | 8/2023 | Morris | ............ | B01D 29/03 |
| | | | | 210/500.1 |
| 11,761,190 B2* | 9/2023 | Yeoman | ............ | E03F 5/0404 |
| | | | | 210/747.2 |
| 11,769,027 B1* | 9/2023 | Lopez | ............ | E03F 5/041 |
| | | | | 235/375 |
| 2001/0047955 A1* | 12/2001 | Chinn | ............ | E03F 5/06 |
| | | | | 210/164 |
| 2002/0014445 A1* | 2/2002 | Cardwell | ............ | E03F 5/0404 |
| | | | | 210/163 |
| 2002/0020658 A1* | 2/2002 | Isaacson | ............ | E03F 5/0404 |
| | | | | 210/162 |
| 2002/0113025 A1* | 8/2002 | Gauldin | ............ | E03F 5/0401 |
| | | | | 210/767 |
| 2003/0047497 A1* | 3/2003 | Harris | ............ | E03F 1/00 |
| | | | | 210/170.03 |
| 2003/0053862 A1* | 3/2003 | Shaw | ............ | E03F 1/00 |
| | | | | 405/40 |
| 2003/0098267 A1* | 5/2003 | Page | ............ | E03F 5/0404 |
| | | | | 210/164 |
| 2003/0132150 A1* | 7/2003 | Happel | ............ | E03F 1/00 |
| | | | | 210/163 |
| 2003/0173277 A1* | 9/2003 | Shaw | ............ | E03F 5/0404 |
| | | | | 210/163 |
| 2003/0217955 A1* | 11/2003 | Strawser, Sr. | ......... | E03F 5/0404 |
| | | | | 210/163 |
| 2004/0011731 A1* | 1/2004 | Sanguinetti | ........... | E03F 5/0404 |
| | | | | 210/483 |
| 2004/0049846 A1* | 3/2004 | Cornwall | ............ | E03F 5/042 |
| | | | | 4/679 |
| 2004/0069697 A1* | 4/2004 | Martinez | ............ | E03F 1/00 |
| | | | | 210/163 |
| 2004/0099586 A1* | 5/2004 | Imoto | ............ | E03F 5/08 |
| | | | | 210/85 |
| 2004/0128903 A1* | 7/2004 | Wexler | ............ | A01M 29/34 |
| | | | | 43/122 |
| 2004/0173513 A1* | 9/2004 | Nino | ............ | E03F 5/125 |
| | | | | 210/163 |
| 2004/0200767 A1* | 10/2004 | Singleton | ............ | E03F 1/00 |
| | | | | 210/163 |
| 2004/0226869 A1* | 11/2004 | McClure | ............ | E03F 5/0404 |
| | | | | 210/163 |
| 2004/0256298 A1* | 12/2004 | Curtolo | ............ | E03F 5/0404 |
| | | | | 210/163 |
| 2005/0000872 A1* | 1/2005 | Middleton | ............ | C02F 1/285 |
| | | | | 210/163 |
| 2005/0051467 A1* | 3/2005 | Yehuda | ............ | E03F 5/046 |
| | | | | 210/163 |
| 2005/0067338 A1* | 3/2005 | Page | ............ | E03F 5/0404 |
| | | | | 210/164 |
| 2005/0072738 A1* | 4/2005 | Weir | ............ | E03F 5/16 |
| | | | | 210/163 |
| 2005/0081428 A1* | 4/2005 | Ramsey | ............ | A01M 7/0046 |
| | | | | 43/132.1 |
| 2005/0183997 A1* | 8/2005 | Happel | ............ | E03F 5/0404 |
| | | | | 210/163 |
| 2005/0207839 A1* | 9/2005 | Tremouilhac | ........... | E03F 5/046 |
| | | | | 404/5 |
| 2005/0230317 A1* | 10/2005 | Belasco | ............ | E03F 5/0404 |
| | | | | 210/163 |
| 2006/0091049 A1* | 5/2006 | Hurst | ............ | E03F 5/0404 |
| | | | | 210/163 |
| 2006/0102543 A1* | 5/2006 | Peters, Jr. | ............ | E03F 1/00 |
| | | | | 210/170.03 |
| 2006/0124520 A1* | 6/2006 | Hurst | ............ | E03F 5/0404 |
| | | | | 210/163 |
| 2006/0169648 A1* | 8/2006 | Fitzgerald | ............ | E03F 1/00 |
| | | | | 210/170.03 |
| 2006/0234867 A1* | 10/2006 | Dupree | ............ | A01N 25/08 |
| | | | | 504/358 |
| 2006/0285925 A1* | 12/2006 | Fattori | ............ | E01C 11/227 |
| | | | | 405/36 |
| 2006/0285926 A1* | 12/2006 | Saurenman | ............ | E03F 1/00 |
| | | | | 405/36 |
| 2007/0045162 A1* | 3/2007 | Hurst | ............ | E03F 1/00 |
| | | | | 210/163 |
| 2007/0090033 A1* | 4/2007 | Kelley | ............ | E03F 1/00 |
| | | | | 210/163 |
| 2007/0110514 A1* | 5/2007 | Orser | ............ | E01C 11/223 |
| | | | | 404/4 |
| 2007/0138074 A1* | 6/2007 | Howard | ............ | E03F 1/00 |
| | | | | 210/163 |
| 2007/0187310 A1* | 8/2007 | Weir | ............ | E03F 1/00 |
| | | | | 210/163 |
| 2007/0215216 A1* | 9/2007 | Farruggia | ............ | F16K 15/038 |
| | | | | 137/512 |
| 2007/0262009 A1* | 11/2007 | Fitzgerald | ............ | E03F 5/0404 |
| | | | | 210/170.03 |
| 2007/0295652 A1* | 12/2007 | Kent | ............ | E03F 1/00 |
| | | | | 210/164 |
| 2008/0006568 A1* | 1/2008 | Moody | ............ | E03F 5/0404 |
| | | | | 210/163 |
| 2008/0014021 A1* | 1/2008 | Flury | ............ | E03F 5/046 |
| | | | | 405/94 |
| 2008/0073277 A1* | 3/2008 | Paoluccio | ............ | E03F 5/0404 |
| | | | | 210/163 |
| 2008/0093280 A1* | 4/2008 | Kang | ............ | E03F 5/0404 |
| | | | | 210/163 |
| 2008/0105603 A1* | 5/2008 | Hurst | ............ | E03F 1/00 |
| | | | | 210/163 |
| 2008/0145150 A1* | 6/2008 | Shaw | ............ | E03F 1/00 |
| | | | | 405/36 |
| 2008/0149544 A1* | 6/2008 | Shaw | ............ | E03F 1/00 |
| | | | | 210/163 |
| 2008/0179229 A1* | 7/2008 | Dorsey | ............ | E03F 1/00 |
| | | | | 210/163 |
| 2008/0226390 A1* | 9/2008 | Nino | ............ | E03F 5/046 |
| | | | | 404/5 |
| 2008/0296211 A1* | 12/2008 | Swan | ............ | E03F 5/0404 |
| | | | | 210/163 |
| 2009/0014371 A1* | 1/2009 | Cook | ............ | E03F 5/0404 |
| | | | | 210/170.03 |
| 2009/0039022 A1* | 2/2009 | Belasco | ............ | E03F 5/14 |
| | | | | 210/651 |
| 2009/0067922 A1* | 3/2009 | Fattori | ............ | E01C 11/223 |
| | | | | 404/4 |
| 2009/0095682 A1* | 4/2009 | Paoluccio | ............ | E03F 5/0404 |
| | | | | 210/660 |
| 2009/0101553 A1* | 4/2009 | Lucas | ............ | E03F 5/0404 |
| | | | | 210/164 |
| 2009/0101591 A1* | 4/2009 | Lewis | ............ | E03F 5/0404 |
| | | | | 210/163 |
| 2009/0114579 A1* | 5/2009 | Dyer | ............ | E03F 5/046 |
| | | | | 210/162 |
| 2009/0120855 A1* | 5/2009 | Flury | ............ | E03F 5/0404 |
| | | | | 210/137 |
| 2009/0208289 A1* | 8/2009 | Flury | ............ | E03F 5/0401 |
| | | | | 405/94 |
| 2009/0236293 A1* | 9/2009 | Alvarado | ............ | E03F 5/0404 |
| | | | | 210/163 |
| 2010/0018593 A1* | 1/2010 | Farruggia | ............ | F16K 15/038 |
| | | | | 137/527 |
| 2010/0147752 A1* | 6/2010 | Jarvis, Jr. | ............ | E03F 1/00 |
| | | | | 210/123 |
| 2010/0258490 A1* | 10/2010 | Haschke | ............ | E03F 5/0404 |
| | | | | 210/166 |
| 2010/0288684 A1* | 11/2010 | Lopez | ............ | E03F 1/00 |
| | | | | 210/163 |

(56) References Cited

U.S. PATENT DOCUMENTS

| | | | | |
|---|---|---|---|---|
| 2011/0049027 A1* | 3/2011 | Rueda | ............... | E03F 5/0404 210/163 |
| 2011/0100886 A1* | 5/2011 | Lill | ............... | E03F 5/046 210/164 |
| 2011/0120923 A1* | 5/2011 | Shaw | ............... | E03F 1/00 210/163 |
| 2011/0240536 A1* | 10/2011 | Tseng | ............... | E03F 5/042 210/136 |
| 2011/0278237 A1* | 11/2011 | McInnis | ............... | E03F 5/14 210/163 |
| 2012/0043266 A1* | 2/2012 | Moody | ............... | E03F 5/0404 210/163 |
| 2012/0097617 A1* | 4/2012 | Blundell | ............... | E03F 5/0404 210/170.03 |
| 2012/0103883 A1* | 5/2012 | Friezner | ............... | F15D 1/0005 210/156 |
| 2012/0192950 A1* | 8/2012 | Huber | ............... | E03C 1/298 137/1 |
| 2012/0222995 A1* | 9/2012 | Sasaki | ............... | E03F 5/14 210/170.03 |
| 2012/0222996 A1* | 9/2012 | Rennels | ............... | E03C 1/264 210/163 |
| 2012/0241028 A1* | 9/2012 | Kirk | ............... | E03F 7/06 137/527 |
| 2012/0294676 A1* | 11/2012 | Lill | ............... | E03F 5/046 404/4 |
| 2013/0011192 A1* | 1/2013 | Lill | ............... | E03F 5/046 404/4 |
| 2013/0056399 A1* | 3/2013 | Downare | ............... | E03F 5/0404 210/170.03 |
| 2013/0092632 A1* | 4/2013 | Allard | ............... | E03F 1/00 210/170.03 |
| 2013/0118963 A1* | 5/2013 | Bailey | ............... | E03F 5/0404 137/15.01 |
| 2013/0186811 A1* | 7/2013 | Kaiser | ............... | E03F 5/0404 210/163 |
| 2014/0041744 A1* | 2/2014 | Friezner | ............... | E03F 5/0404 138/39 |
| 2014/0154006 A1* | 6/2014 | Thomas | ............... | E03F 3/043 404/4 |
| 2014/0165835 A1* | 6/2014 | Perron | ............... | E03F 5/08 96/222 |
| 2014/0332452 A1* | 11/2014 | Wacome | ............... | E03F 5/0404 210/170.03 |
| 2014/0367328 A1* | 12/2014 | Allard | ............... | E03F 1/002 210/747.2 |
| 2015/0053598 A1* | 2/2015 | Friezner | ............... | E03F 5/0404 210/156 |
| 2015/0101971 A1* | 4/2015 | Jarvis | ............... | E03F 5/06 210/154 |
| 2017/0022696 A1* | 1/2017 | Jarvis | ............... | E03F 5/046 |
| 2017/0136392 A1* | 5/2017 | Perry | ............... | B01D 29/58 |
| 2020/0123757 A1* | 4/2020 | Friezner | ............... | E03F 5/0401 |
| 2020/0256046 A1* | 8/2020 | Friezner | ............... | E03F 5/0411 |
| 2020/0370290 A1* | 11/2020 | Yeoman | ............... | B01D 21/0039 |
| 2022/0025633 A1* | 1/2022 | Yeoman | ............... | E03F 5/0404 |
| 2022/0167609 A1* | 6/2022 | Friezner | ............... | E03F 5/041 |
| 2022/0251819 A1* | 8/2022 | Friezner | ............... | E03F 5/107 |
| 2023/0235545 A1* | 7/2023 | Duban | ............... | E03F 5/041 4/679 |

* cited by examiner

VECTOR CONTROL SCREEN FOR STORMWATER TREATMENT SYSTEMS

CROSS-REFERENCE TO RELATED APPLICATIONS

This is a Non-Provisional Application claiming the benefit of co-pending Provisional Application No. 63/120,429 filed Dec. 2, 2020.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates generally to storm water treatment and storage systems. More particularly, the invention concerns the deflection of the proliferation of mosquitos and other biologically transmitting vector insect species attracted to standing water captured in stormwater treatment and water storage systems.

Description of Related Art Including Information Disclosed Under 37 CFR 1.97 and 1.98

It is well known that mosquitos and other transmitting vector insects adversely impact public health without decreasing the population size of the transmitting insect. For this reason, in the past, several types of trash and debris capture screens have been integrated with prior art stormwater drainage and water storage systems. Municipalities recognize these public health risks and. have established various mosquito population management regulations in an attempt to mitigate risk to the public. The methods commonly applied include application of insecticides or implementation of mechanical devices such as aeration fountains to prevent stagnation of standing bodies of water. While these approaches may reduce mosquito populations in certain settings, they are not applicable or scalable in most stormwater and water storage systems. As will be discussed in greater detail hereinafter, the present invention solves the problem of mosquito population management by preventing access to standing water in the drainage system.

In one embodiment of the present invention, a standalone vector control screen is used in connection with curbside inlets, grated inlets, trench drains and like water openings. In other embodiments of the invention, a vector control screen is used in conjunction with fluid flow control and debris intercepting apparatus installed at curbside inlets.

One drawback of the standalone vector control screen embodiment of the invention is that it also functions to prevent trash and debris from entering the stormwater system thereby undesirably clogging the entrance to the stormwater system. One solution to this problem is to integrate the vector control screen with existing technologies such as those described in U.S. Pat. Nos. 8,535,523, 8,945,375, and 9,428,899 issued to the named present inventor. The curbside technology described in these patents is hereinafter referred to as "ARS" or automatic retractable screens.

The automatic retractable screens, or "ARS" described in these patents function to block trash and debris from entering storm drain management systems during low volume surface water runoff flows and light to moderate rain events. First, this apparatus includes screening blades which move independently to block trash and debris at the entrance of a stormwater drain while allowing water to be captured underneath. In one form of the present invention, the vector control screen is disposed behind the moving blades located at the curb inlet level so as to effectively prevent passage of mosquitos and similar insect species that are attracted to standing water captured within stormwater treatment and water storage systems.

BRIEF SUMMARY OF THE INVENTION

By way of brief summary, the present invention comprises an apparatus for controlling ingress and egress of biologically transmitting insect species to standing water disposed within a stormwater treatment and water storage system.

With the forgoing in mind, it is an object of the present invention to provide an apparatus that can be readily connected to catch basin curbside inlets, grated inlets, trench drains and like openings to effectively control ingress and egress of insect species such as mosquitos to standing water disposed therewithin.

Another object of the invention is to provide an apparatus of the character described in which the apparatus comprises a screen connected to the catch basin.

Another object of the invention is to provide an apparatus of the character described in which the screen is movable between a first position closing the inlet of the catch basin and a second position opening the inlet of the catch basin.

Another object of the invention is to provide an apparatus of the character described in the preceding paragraphs in which said screen is a vector control screen.

Still another object of the invention is to provide an apparatus of the character described in which the vector control screen of the invention is integrated with existing technologies such as those described in U.S. Pat. Nos. 8,535,523, 8,945375, and 9,428,899 issued to the named present inventor.

Another object of the invention is to provide an apparatus of the character described in the previous paragraph in which the existing technologies to which the vector control screen of the invention is integrated comprises an automatic retractable screen connected to said catch basin for movement with respect thereto to block entry of trash and debris into said stormwater inlet.

Yet another object of the invention is to provide an apparatus of the character described in the previous paragraph in which the vector control screen of the invention is movable relative to the automatic retractable screen between a first position wherein the upper portion of the screen is adjacent the automatic retractable screen and a second position wherein the lower portion of the screen is spaced apart from said automatic retractable screen.

These and other objects of the invention will become apparent from the discussion that follows.

DESCRIPTION OF THE INVENTION

Figure 1:
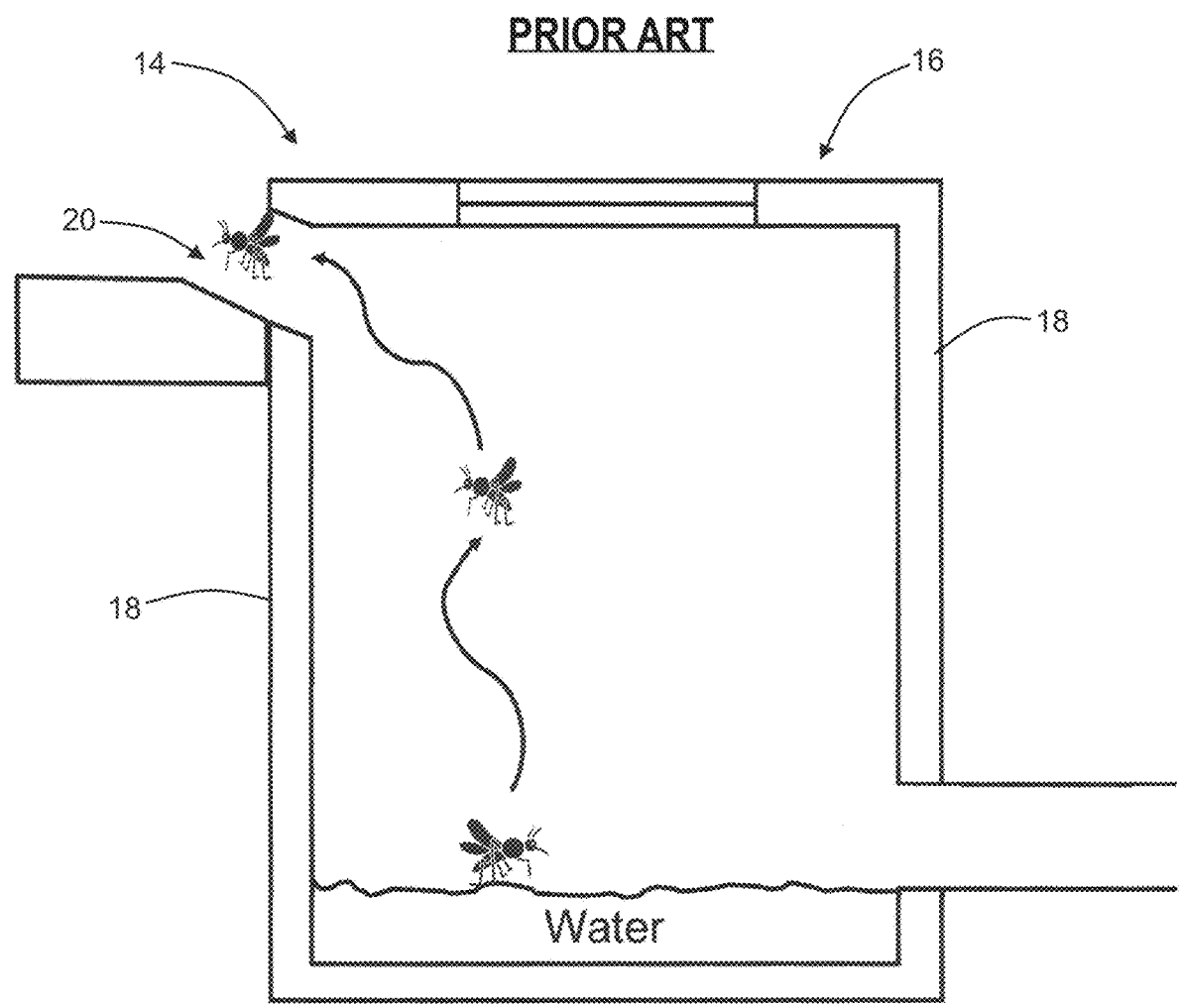
FIG. 1 is a side elevational, cross-sectional view of the catch basin of a stormwater treatment and water storage system.
Figure 2:
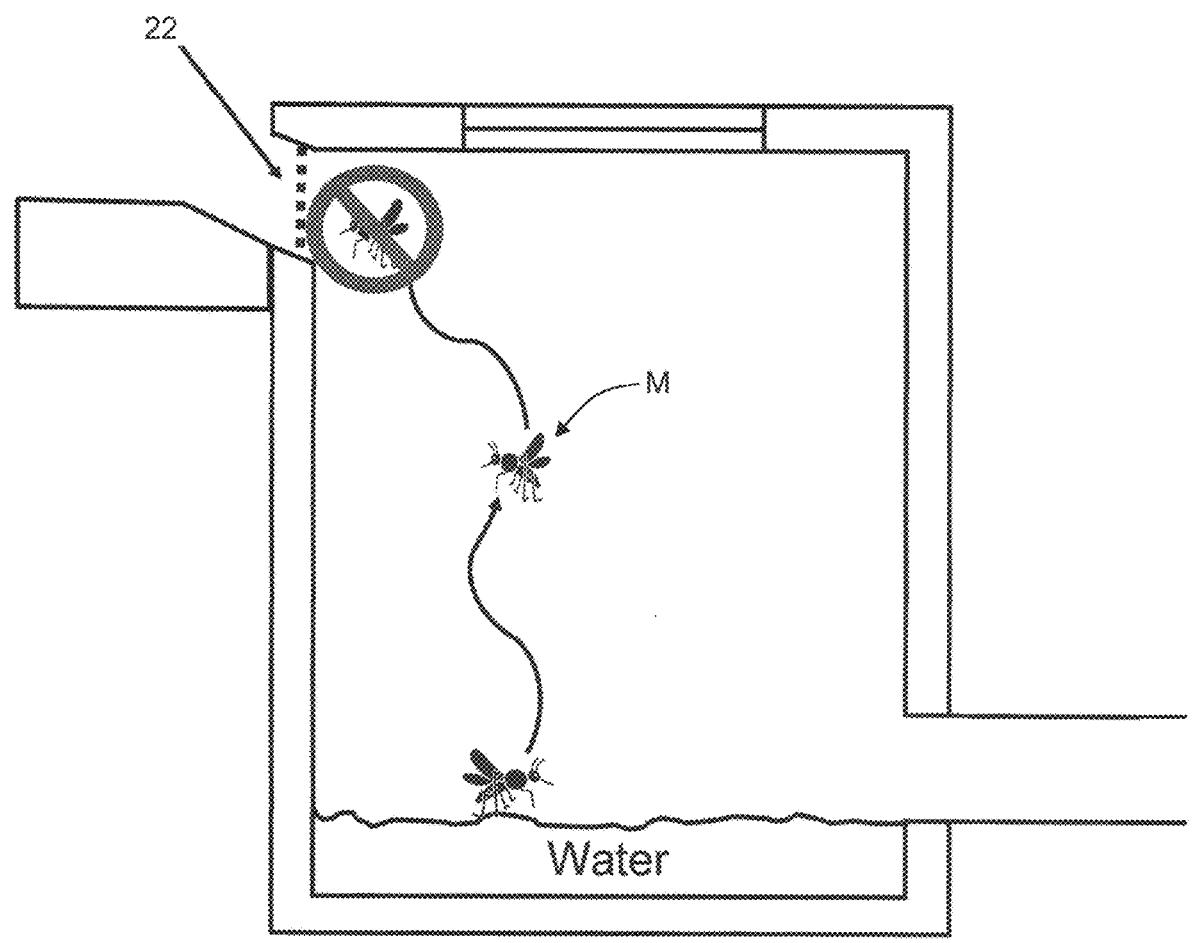
FIG. 2 is a side elevational, cross-sectional diagrammatical view of one form of the apparatus of the invention showing the control screen of the invention affixed to the inlet of a typical catch basin of a stormwater treatment and water storage system and blocking egress of a mosquito.

Referring to the drawings and particularly to FIG. 1, there is shown a side elevational, cross-sectional view of a typical prior art curbside catch basin of a storm water treatment and water storage system. This catch basin, which is generally designated by 14, comprises a structure 16 having spaced apart side walls 18 that define the opening 20 through which fluid, such as rainwater flows. FIG. 2 of the drawings illustrates one form of the apparatus of the invention for controlling the passage of biologically transmitting insect species through the inlet of the catch basin of a storm water treatment and water storage system. This form of the invention here comprises a standalone vector control screen 22 that is connected to the catch basin in the manner shown in FIG. 2 of the drawings. More particularly, vector control screen 22 is affixed to the inlet 24 of a typical catch basin of a storm water treatment and water storage system such as that shown in FIG. 1 of the drawings. The term "vector" as used herein means an organism, typically a biting insect, that transmits a disease or parasite from one animal or plant to another. As can be seen by referring to FIG. 3 Of the drawings, the vector control screen of the invention is movable between a first position closing the inlet of the catch basin, and a second position opening the inlet.

Figure 3:
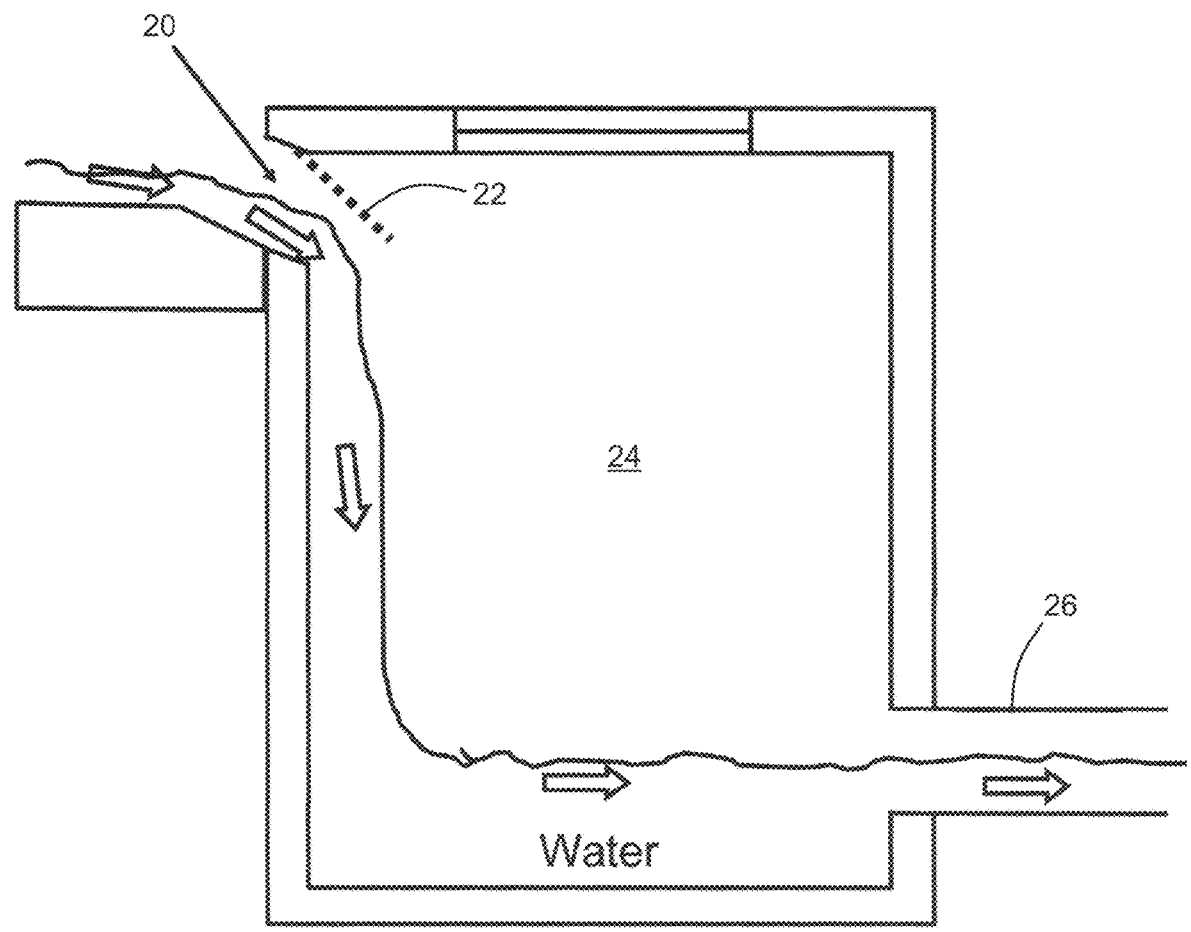
FIG. 3 is a side elevational, cross-sectional diagrammatical view similar to FIG. 2 showing the control screen of the invention moved into an open position allowing ingress of water into the catch basin.

FIG. 3 is a side elevational, cross-sectional diagrammatical view similar to FIG. 2 showing the control screen 22 of the invention in an open position for allowing the flow of storm water into the interior 24 of the catch basin and outwardly there from through an outlet 26. In FIG. 2, the control screen 22 is shown in a closed position blocking egress of a mosquito "M".

Figure 4:
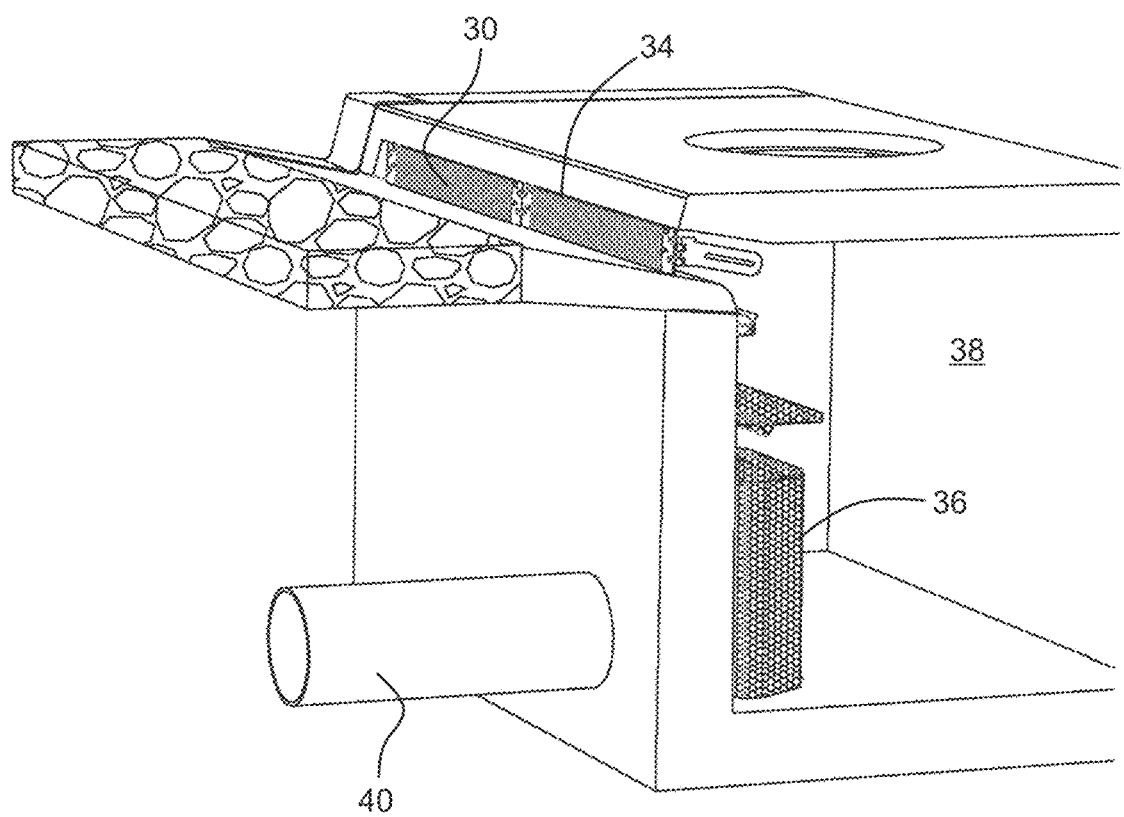
FIG. 4 is a generally perspective fragmentary view showing another form of the invention affixed to the catch basin of a stormwater treatment and water storage system

Turning to FIG. 4 of the drawings, another form of the apparatus of the invention is there shown. This form of the invention is similar in many respects to the previously described embodiments and here comprises a standalone vector control screen 30 that is connected to the catch basin 32 in the manner shown in FIG. 4 of the drawings. More particularly, vector control screen 30 is affixed proximate the inlet 34 of a typical catch basin of a storm water treatment and water storage system such as that shown in FIG. 4 of the drawings. As before, the vector control screen is movable between a first position closing said inlet of the catch basin and a second position opening said inlet of the catch basin. An additional feature of the apparatus of this latest form of the invention resides in the provision of a porous, cage like mosquito capture structure 36 that is disposed within the interior 38 of the catch basin and in communication with the storm water outlet 40. Mosquito capture structure 36 effectively captures insects such as mosquitoes that may be located within the water outlet 40.

Figure 5:
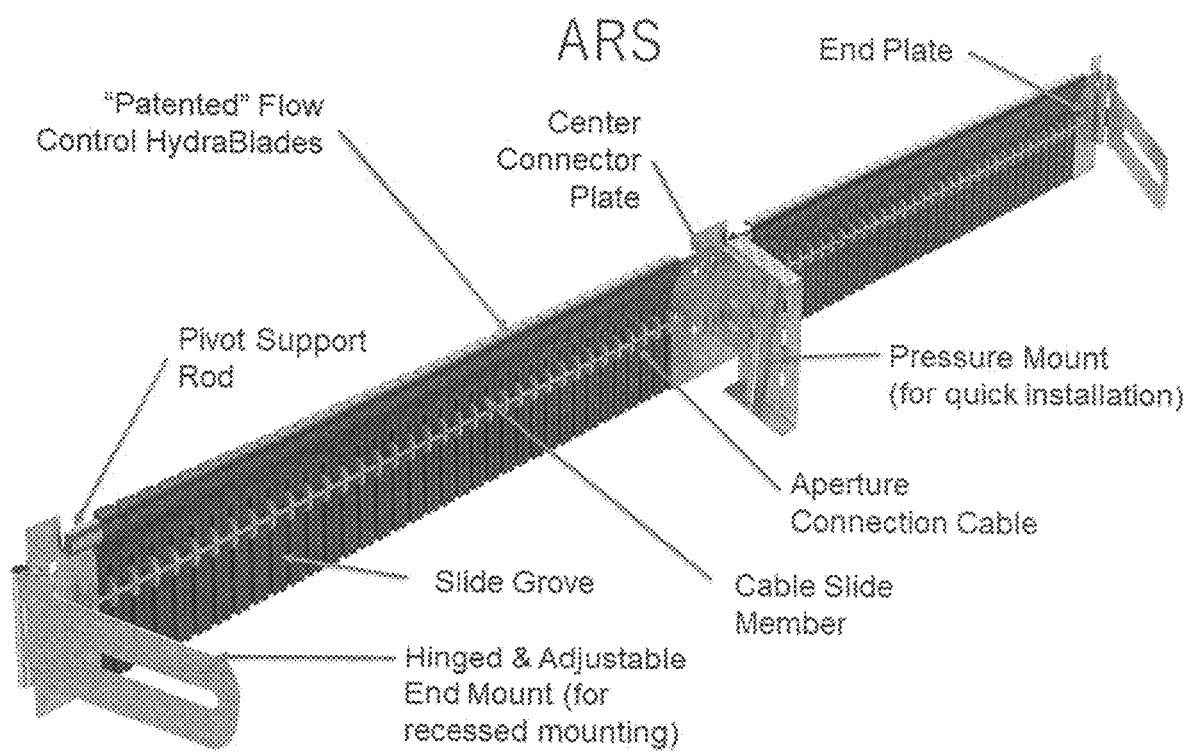
FIG. 5 is a generally perspective view of a prior art apparatus designed to block trash and debris from entering the storm drain management systems during low-volume surface water runoff.

Turning now to FIG. 5 of the drawings, this drawing is a generally perspective, diagrammatic view of one of the previously mentioned automatic retractable screens or "ARS" described in U.S. Pat. Nos. 8,535,523, 8,945,375, and 9,428,899. Notations appearing on FIG. 5 identify various components of the automatic retractable screen.

Figure 6:
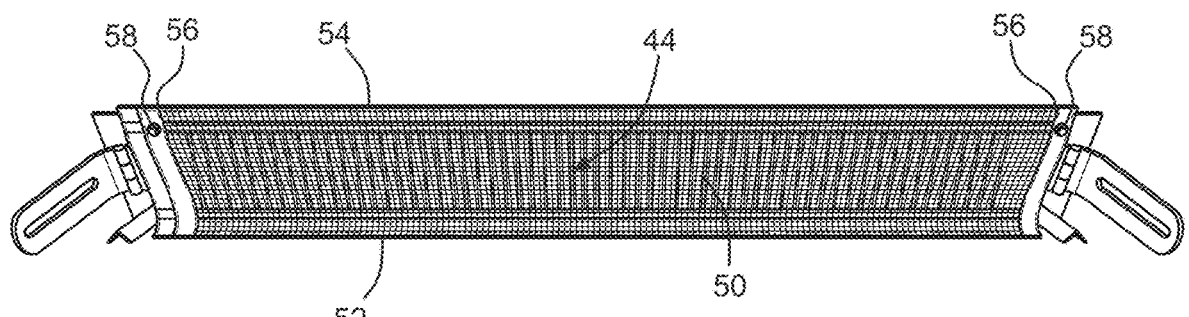
FIG. 6 is a generally perspective view showing another form of the apparatus of the invention in which the control screen of the invention is interconnected with the prior art apparatus designed to block trash and debris from entering the storm drain.
Figure 7:
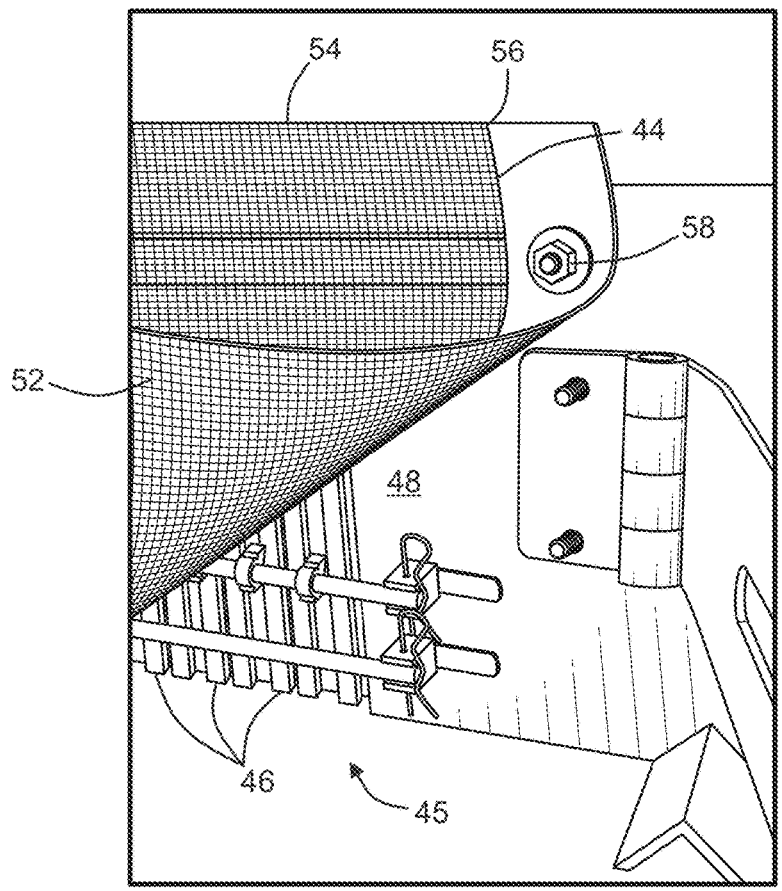
FIG. 7 is a generally perspective fragmentary view illustrating the manner of movement of the control screen relative to the stormwater treatment and water storage system.

Referring next to FIGS. 6 and 7 of the drawings, these drawings illustrate yet another embodiment of the present invention in which the control screen of the invention, here identified by the numeral 44, is interconnected with the prior art automatic retractable screen 45 of the "ARS" apparatus. As previously mentioned, the automatic retractable screen 45 includes a plurality of screening blades 46 (see FIG. 7) that move independently to block trash and debris at the entrance 48 of a storm water drain while allowing water to be captured underneath (see U.S. Pat. No. 9,428,899 for greater details). In this latest form of the present invention, the vector control screen 44 includes a generally planer body 50 having a lower portion 52 and an upper portion 54 having spaced apart corners 56. As best seen in FIG. 7, vector control screen 44 is interconnected with the automatic retractable screen 45 by conventional connectors 58 located at corners 56 of the vector control screen. As shown in the drawings, vector control screen 44 is disposed behind the moving blades 46 so as to effectively prevent passage of mosquitos and similar insect species that are attracted to standing water captured within storm water treatment and water storage systems. As illustrated in FIGS. 6 and 7, in this embodiment of the invention, vector control screen 44 is movable between a first position in close proximate to the automatic retractable screen 45 and a second position wherein part of the planer body 50 is spaced apart from the automatic retractable screen 45. When the vector control screen is in its first position, mosquito ingress and egress is blocked and when the vector control screen is in its second position, the flow of storm water through the storm water inlet is unimpeded.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention as set forth in the following claims.

I claim:

1. An apparatus for controlling ingress and egress of disease transmitting insect species that are attracted to standing water disposed within a stormwater treatment and water storage system that includes a catch basin having a stormwater inlet, the apparatus including:
   an automatic retractable screen including a plurality of vertical screening blades 46 that each move independently to block and prevent trash and debris from entering the stormwater inlet, the automatic retractable screen being movably connected to the catch basin for movement with respect thereto; and a vector control screen comprising a planar body 50 spanning the stormwater inlet that is disposed behind the moving blades 46 and connected to said automatic retractable screen, the vector control screen 44 is movable between a first position adjacent to the automatic retractable screen 45 and a second position wherein part of the planer body 50 is spaced apart from the automatic retractable screen 45;

wherein, in the first position, insect species ingress and egress is blocked and when the vector control screen is in the second position, a flow of storm water through the storm water inlet is unimpeded.

\* \* \* \* \*